United States Patent [19]

Schmelter et al.

[11] 4,334,260
[45] Jun. 8, 1982

[54] WALL-TYPE INTERCOM STATION FOR DETENTION AND PENITENTIARY FACILITIES

[76] Inventors: Ernst A. Schmelter, Lustenbergweg 5; Bruno W. Simmert, Bruckner-Str. 35, both of D-4404 Telgte, Fed. Rep. of Germany

[21] Appl. No.: 160,189

[22] Filed: Jun. 17, 1980

[30] Foreign Application Priority Data

Mar. 13, 1980 [DE] Fed. Rep. of Germany ... 8006854[U]

[51] Int. Cl.³ .............................................. H02B 1/04
[52] U.S. Cl. .................................. 361/360; 361/331; 361/429; 174/52 R; 200/301; 200/310; 220/4 R
[58] Field of Search ............... 361/331, 334, 356–363, 361/380, 386, 392, 422, 429; 200/159 R, 297, 293, 301, 302, 303, 310, 314, 328, 340; 174/52 R, 52 PE, 53, 54, 55, 58; 220/4 R, 4 A, 4 F, 18

[56] References Cited

U.S. PATENT DOCUMENTS 3,299,199 1/1967 Mattingly ............................ 174/58
3,935,931 2/1976 Kaplan ................................ 220/4 F
4,057,164 11/1977 Maier .................................. 174/58

FOREIGN PATENT DOCUMENTS 7807398 9/1978 Fed. Rep. of Germany .

Primary Examiner—Gerald P. Tolin
Attorney, Agent, or Firm—Merchant, Gould, Smith, Edell, Welter & Schmidt

[57] ABSTRACT

A wall-type intercom station for detention and penitentiary facilities is disclosed. The station is comprised of a flush mounting box (2') which is formed of a plurality of profile elements (21, 24, 25) that are structured as extruded profiles. The profile (21) is generally C-shaped and forms a bottom wall, top wall, and back wall of the box (2'). Profiles (24, 25) form side walls of the box (2'). A ring (26) is received about the perimeter of the profiles (21, 24, 25) and is received within slots (40, 42, 44, 46) formed along the front edge of the profile elements. Pushbutton switches (15) and lights (16) are secured to a cover plate (5) within jar-like containers filled with pressed glass (31).

18 Claims, 6 Drawing Figures

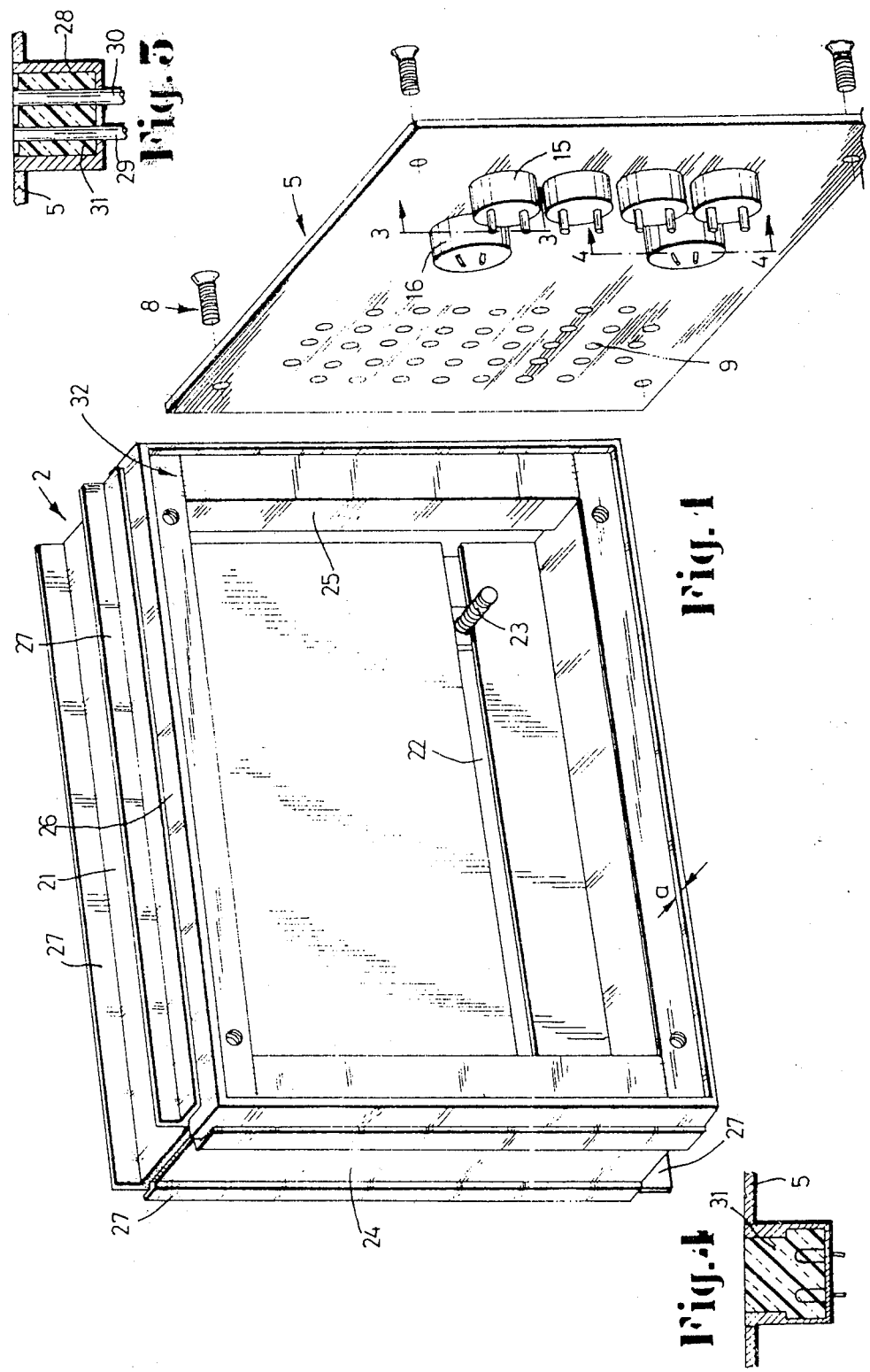

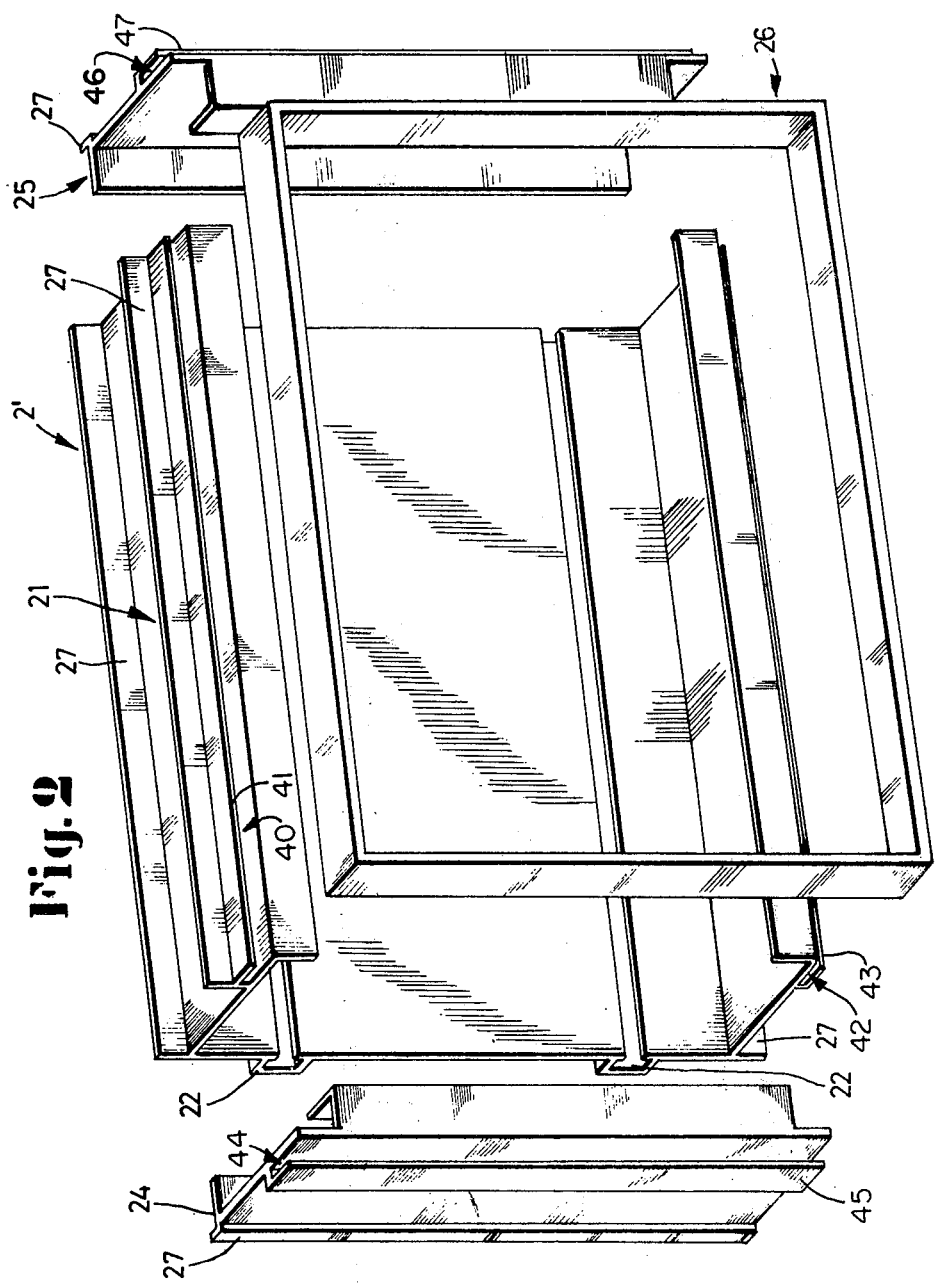

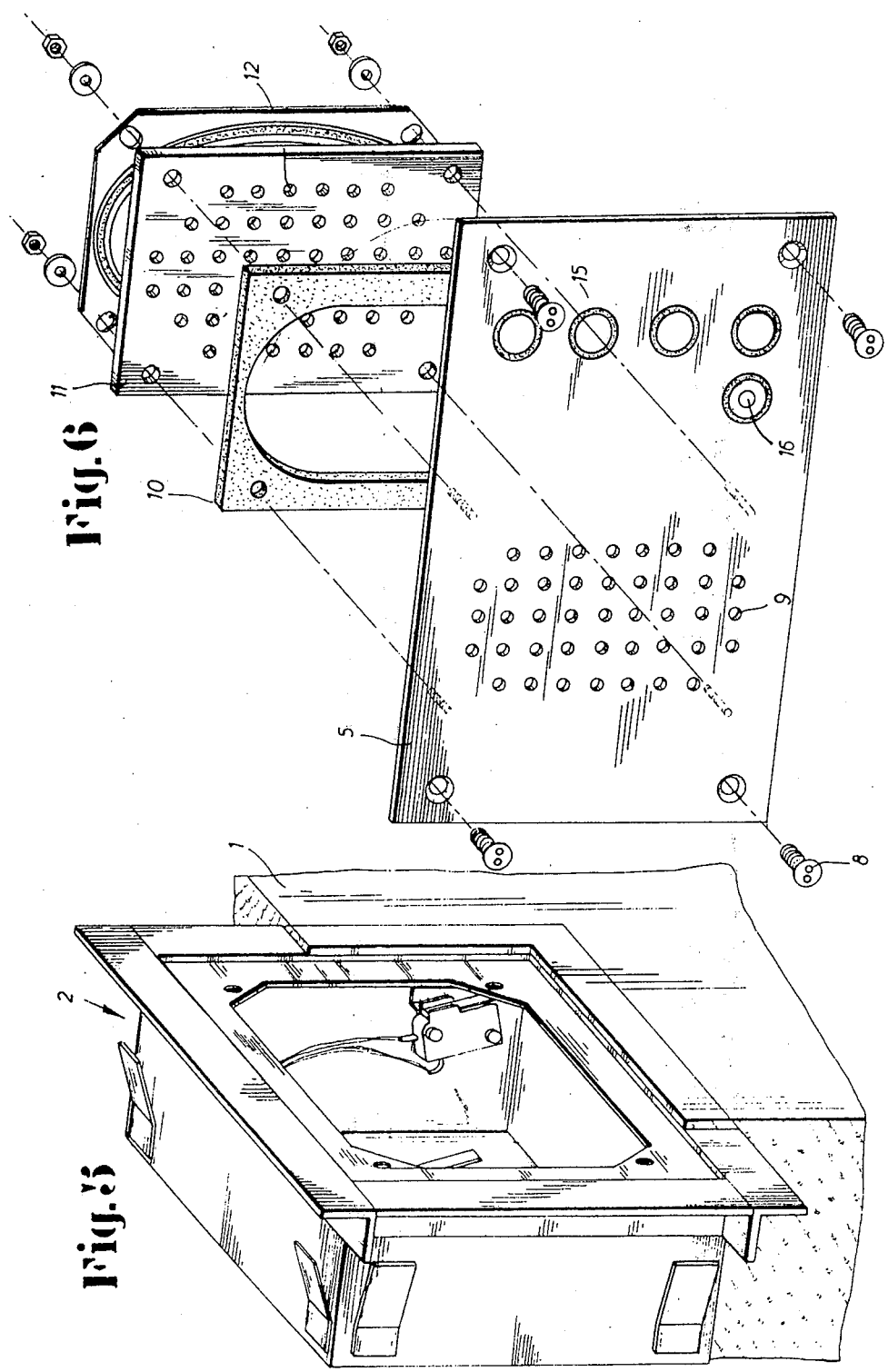

WALL-TYPE INTERCOM STATION FOR DETENTION AND PENITENTIARY FACILITIES

TECHNICAL FIELD

The invention relates to a wall-type intercom station in a communications and reporting system for detention and penitentiary facilities, with a flush mounting box, a cover plate with sound penetration openings closing off said box to the outside, sensor pushbutton switches arranged in the cover plate as well as fastening screws for attaching the cover plate to the flush mounting box.

BACKGROUND OF THE INVENTION

Wall-type intercom stations of the precedingly characterized type are known from the German utility "model" patent No. 78 07 398 and have the task of providing, in detention and penitentiary facilities, wall-type intercom station as a communications system where an undesired opening or damaging is to be excluded.

The known arrangements for this work used a metal fabricated box that had to be assembled from individual components, with sensor pushbutton switches and signaling contrivances that were imbedded in plastic and were built into the front of the cover plate in order, therewith, to avoid removal.

SUMMARY OF THE INVENTION

The task set forth for the invention is to improve these arrangements such that, on the one hand, their construction is simplified; and, on the other hand, that the possibility of damaging them is reduced still further.

This task set forth for the invention will be resolved by the measures characterized in the claims, in particular by the fact that the box is formed of extruded profiles so that several sections that form the actual box body can be cut off from one single, long extruded profile which, out from the sides, can then be closed off through means of appropriate extruded profile elements. Joining of these elements together can be accomplished by means of a front ring holding the elements together; further capable of being undertaken is a cementing or welding of the individual elements.

C-slots are capable of being constructed in the floor side of the C-shaped structured extruded profile for forming the box body. The C-slots enable, in simplest fashion, laying in the structural components that are to be held inside the box.

The actual sensor pushbutton switches are formed, in accordance with a very essential feature of the invention, by sensor switch pins that line up, with their outermost edge, with the top side of the cover plate. These pins, like the signal lamps, are lodged in jar-like containers cast with pressed glass, with the sensor pins projecting over the top side of the pressed glass layer while, in the case of the indicator lights, the pressed glass layer closes off flush-fashion with the surface of the cover plate so that an edge that could serve for holding tools for inflicting damage is avoided.

Further advantageous embodiments of the invention are obtained from the following description with the aid of the drawings.

BRIEF DESCRIPTION OF THE DRAWINGS

FIG. 1 is a perspective view of the body of the box with cover plate in a disassembled representation;

FIG. 2 is an exploded perspective view of elements forming the body of the box;

FIG. 3 is a sectional view taken generally along line 3—3 of FIG. 1 through one of the containers accommodating the sensor switch pins;

FIG. 4 is a sectional view through a container equipped with a signal lamp taken generally along line 4—4;

FIG. 5 is a perspective view partially in section through the flush mounted box without the front light; and FIG. 6 is a disassembled representation of individual components.

DETAILED DESCRIPTION OF THE INVENTION

Designated in FIG. 5 with 2 is a flush mounting box that is covered on its front side by a cover plate 5, which itself can be attached to the flush mounting box by means of appropriate fastening screws 8. The cover plate 5 has sound penetration openings 9 formed through it and is equipped with sensor pushbutton switches 15 and light signals 16. For reasons of clarity, the electrical components arranged inside the flush mounting box 2 are not illustrated. The fastening means for the cover plate 5 consist, in the case of the example of embodiment illustrated, of two-hole screws 8 that can be manipulated from the outside only with extraordinary difficulty.

The cover plate has so-called sound penetration openings 9 formed through it and provided on the back side of the cover plate 5, with interposition of a sound attenuating sealing profile 10, is an auxiliary cover plate 11 that likewise has sound penetration openings 12, which, however, are arranged offset relative to the sound penetration openings 9 so that no accessibility to the inside of the flush mounting box can be obtained from the outside through the sound penetration openings.

The back side of the auxiliary cover plate 11 supports a microphone-loudspeaker that is known per se.

As shown in FIGS. 1-4, a flush mounting box 2' itself is formed by profile elements that are structured as extruded profiles. The actual body of the box 2' is formed by a C-shaped extruded profile 21 that is provided on its wall forming the floor side with C-shaped slots 22 that serve for accepting attachment elements 23. The required non-illustrated electrical components are capable of being attached in simplest fashion inside of box 2' with these attaching elements 23. As seen in FIG. 2, the profile 21 includes top, bottom and back wall members formed integral with one another.

The two side walls of the body of the box 2' are formed by extruded profiles 24 and 25 that are profiled such that they can be fitted into the profile of the extruded profile 21. An auxiliary attachment is accomplished through means of a front ring 26 made of an especially rigid work material, such as steel, which is fitted around the perimeter of profiles 21, 24 and 25. Where, as is indicated in FIG. 1 at 32, the individual extruded profile elements can be additionally bound together by welding or cementing them to one another. Preferentially, however, a firm clamping of the individual components is accomplished through ring 26.

A slot 40 is defined by a ledge 41 extending along the top front of profile 21. A similar slot 42 is defined by a ledge 43 extending along the bottom front of profile 21. A slot 44 is defined by a ledge 45 extending along side wall profile 24; and a similar slot 46 is defined by a ledge 47 extending along side wall profile 25. The slots 40, 42, 44 and 46 open forwardly for reception of ring 26.

As shown by the perspective illustrations, the front ring 26 is joined with the body of the box 20 itself such that it projects by an amount "a" over the most forward edge of the body of the box 20 that corresponds to the thickness of the cover plate 5 that is likewise made of an especially rigid work material, such as steel, so that with the cover plate installed, the top side of the cover plate closes off with the forward edge of the front ring 26 in flush fashion. This alignment of ring 26 can be readily attained by locating the backs of ledges 41, 43, 45, and 47 so that ring 26 projects the distance "a" when the ring 26 abuts the back of the ledges.

Formed out on the outer side of profile elements 21, 24, and 25 are projections 27 that act as anchors and, therewith, simultaneously enable the secure attachment of the box 2' in the wall 1.

In accordance with an essential feature of the invention, the sensor pushbutton switches 15 are totally structured as jar-like containers 28 into which are built the switch pins 29 and 30, with the top edge of the switch pins 29, 30 being aligned with the top edge of the cover plate 5. Attachment of the switch pins 29, 30 is accomplished by means of cast pressed glass 31. In the case of the arrangement illustrated in FIG. 4, a signal lamp closes off the pressed glass fill 31 flush-fashion with the top side of the cover plate 5.

The insertion of the switch pins 29 and 30 is more advantageous when compared to other sensor pushbuttons. The interval between the pins serves the purpose of finger contact not being made with the pressed glass and avoidance, in this fashion, of a film of moisture.

Numerous characteristics and advantages of the invention have been set forth in the foregoing description, together with details of the structure and function of the invention, and the novel features thereof are pointed out in the appended claims. The disclosure, however, is illustrative only, and changes may be made in detail, especially in matters of shape, size, and arrangement of parts, within the principle of the invention, to the full extent extended by the broad general meaning of the terms in which the appended claims are expressed.

What is claimed is:

1. In a wall-type intercom station in a communications and reporting system for detection and penetentiary facilities, with a flush mounting box, a cover plate with sound penetration openings covering the box, sensor pushbutton switches arranged in the cover plate as well as fastening screws attaching the cover plate to the flush mounting box, the improvement comprising the flush mounting box forming profile elements and a front ring being installed in slots of the profile elements, whose front close-off edges are flush with the cover plate.

2. In a wall-type intercom station according to claim 1, wherein one of said profile elements is a C-shaped extruded profile for forming the body of the box and the other of said profile elements for lateral profiles for forming side walls.

3. In a wall-type intercom station according to claim 2, wherein C-slots are formed in the floor of the body of the box and open inwardly toward the body of the box.

4. In a wall-type intercom station according to claim 1 or 2, jar-like containers cast with pressed glass in the cover plate which receive indicator lights and the sensor pushbutton switches.

5. In a wall-type intercom station according to claim 4, sensor pins projecting over the surface of the pressed glass layer, whose top edge is aligned with the plane of the cover plate.

6. In a wall-type intercom station according to claim 1 or 2, projections structured as plaster anchors extending on the outer side of the profiles forming the flush mounting box.

7. In a wall-type intercom station according to claim 1 or 2, an auxiliary cover plate provided with sound penetration openings is attached to the back side of the cover plate with interposition of a vibration damping means.

8. In a wall-type intercom station according to claim 7, wherein the sound penetration openings of the cover plate are offset relative to the sound penetration openings of the auxiliary cover plate.

9. A wall-type intercom station comprising:
a flush mounting box;
a cover plate with sound penetration openings attached to said box for closing off said box to the outside;
switch means arranged in said cover plate;
said mounting box comprising a plurality of profile elements, each profile element having a slot opening toward the front of the box; and
a ring extending around the perimeter of said profile elements and being received within each of said slots, a front edge of said ring lying flush with said cover plate.

10. A wall-type intercom station according to claim 9 wherein one of said profile elements has a generally C-shaped extruded profile including a back wall, a top wall and a bottom wall, and the other said profile elements are profiles which mate with said backs, top and bottom walls to form side walls of said mounting box.

11. A wall-type intercom station according to claim 10 wherein said slots are defined by a ledge extending lengthwise along each of said walls adjacent a front edge thereof, each ledge having a back edge disposed such that said ring is in contact with said back edges, the front edge of said ring and said cover plate lie flush with one another.

12. A wall-type intercom station according to claim 11 wherein each ledge includes a top flange extending forwardly from a respective back edge.

13. A wall-type intercom station according to claim 10, 11, or 12 wherein generally C-shaped slots are formed in said back wall and open forwardly.

14. A wall-type intercom station according to claims 10, 11 or 12 including a plurality of jar-like containers cast containing pressed glass attached to said cover plate holding indicator lights and the switch means.

15. A wall-type intercom according to claim 14 wherein the jar-like containers holding said switch means include sensor pins projecting over an outer-front facing surface of said pressed glass, a top-front facing edge of said pins being aligned with the plane of said cover plate.

16. A wall-type intercom station according to claim 10, 11, or 12 including a projection structured as plaster anchors extending out from each of said walls.

17. A wall-type intercom station according to claim 9, 10, 11, or 12 including an auxiliary cover plate attached to the back side of said cover plate with a vibration damping means interposed therebetween.

18. A wall-type intercom station according to claim 17 wherein the sound penetration openings of said cover plate are offset to sound penetration openings of said auxiliary cover plate.

* * * * *